Aug. 5, 1941.   C. T. ASHBY   2,251,314
REFRIGERATION
Filed Dec. 31, 1937
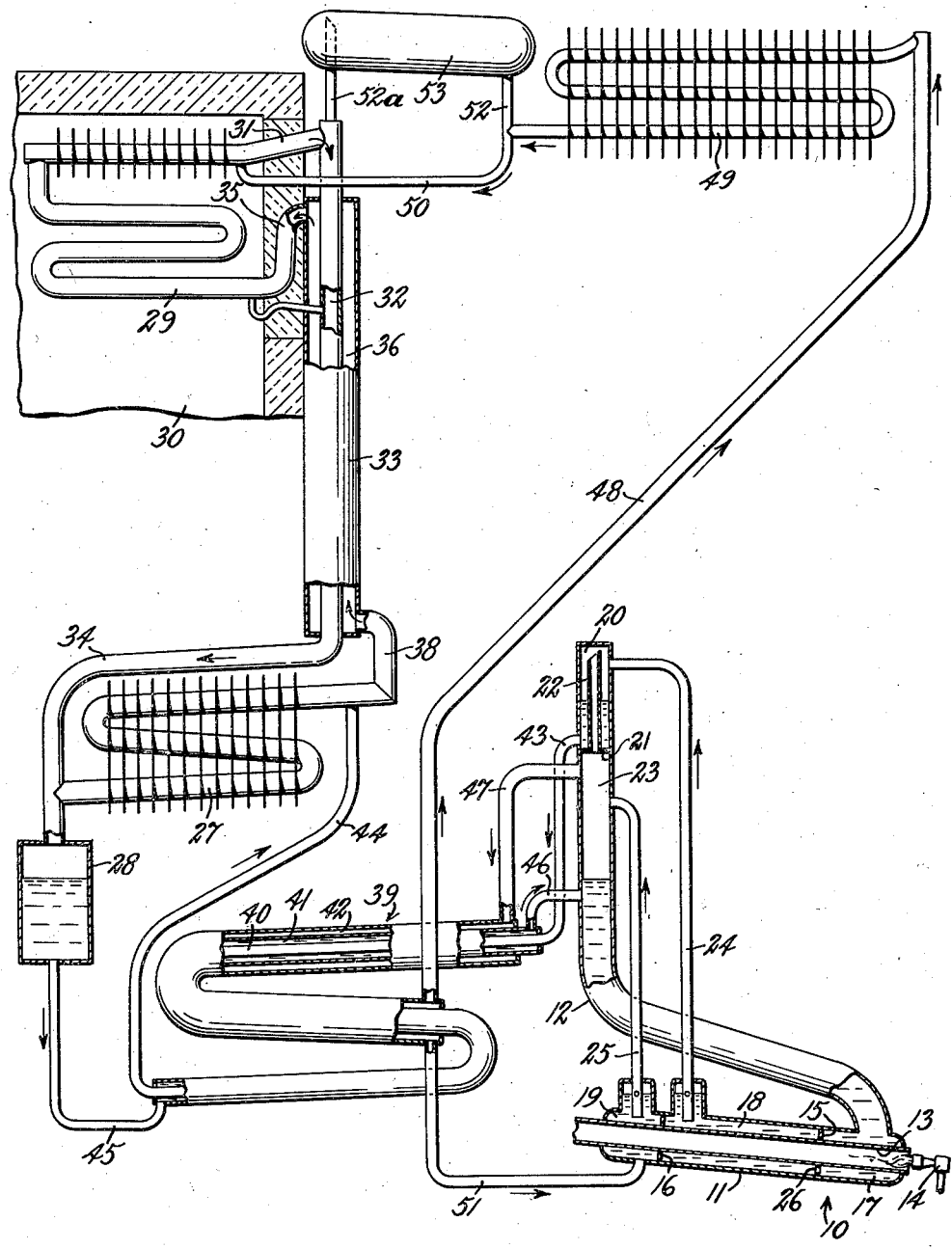
INVENTOR.
Carl T. Ashby
BY  D. E. Heath
his ATTORNEY.

Patented Aug. 5, 1941

2,251,314

UNITED STATES PATENT OFFICE 2,251,314

REFRIGERATION

Carl T. Ashby, Evansville, Ind., assignor to Servel, Inc., New York, N. Y., a corporation of Delaware Application December 31, 1937, Serial No. 182,706

3 Claims. (Cl. 62—119.5)

My invention relates to refrigeration and more particularly to an absorption type refrigeration system making use of evaporation of refrigerant fluid in the presence of an auxiliary pressure equalizing fluid.

It is an object of the invention to provide a refrigeration system of this type which has greater efficiency.

The drawing comprises a single figure showing more or less diagrammatically a refrigeration system embodying the invention. A generator 10 comprises a horizontal portion 11 and an upright portion or standpipe 12. A flue 13 extends through the horizontal portion 11. A gas burner 14 is arranged so that the flame is projected into one end of the flue 13. Other suitable heating means may be used as, for instance, an electric heating element or liquid fuel burner. Partitions 15 and 16 divide the horizontal portion 11 of the generator into three chambers 17, 18, and 19. The lower end of standpipe 12 is connected to chamber 17. The upper end of standpipe 12 is closed and a chamber 20 is formed in this end of the standpipe by a partition 21. A conduit 22 is connected through partition 21 to afford communication between the top of chamber 20 and the top of chamber 23 above and below the partition 21 respectively. A vapor lift conduit 24 is connected from chamber 18 to the upper part of chamber 20. Another vapor lift conduit 25 is connected from chamber 19 to the upper part of chamber 23. The partition 16 is solid. Partition 15 is provided with an opening 26 affording communication between the lower parts of chambers 17 and 18.

An absorber comprises a finned coil 27 and a vessel 28. The lower end of coil 27 is connected to the upper part of vessel 28. The absorber coil 27 is cooled by air. It may be cooled in any other suitable manner as by circulating water or a vaporization-condensation heat transfer circuit.

An evaporator 29 comprises a pipe coil which is located in an insulated refrigerator compartment 30. The upper end of evaporator 29 is connected by a conduit 31, inner passage 32 of gas heat exchanger 33, and conduit 34 to the upper part of the absorber vessel 28. The lower end of the evaporator 29 is connected by conduit 35, the outer passage 36 of the gas heat exchanger 33, and conduit 38 to the upper end of the absorber coil 27.

The generator and absorber are interconnected by members including a triple heat exchanger 39 comprising an inner passage 40, a middle passage 41, and an outside passage 42. The lower part of the generator chamber 20 is connected by a conduit 43, inner passage 40 of the heat exchanger, conduit 44 and conduit 38 to the upper end of the absorber coil 27. The lower part of absorber vessel 28 is connected by a conduit 45, middle passage 41 of the heat exchanger, and conduit 46 to chamber 23 in the generator standpipe 12. The upper part of chamber 23 is connected by a conduit 47, outside passage 42 of the heat exchanger, and conduit 48 to the upper end of an air cooled condenser coil 49. The lower end of the condenser 49 is connected by a conduit 50 to the upper end of the evaporator 29. The outside passage 42 of the heat exchanger 39 is connected by a conduit 51 to the generator chamber 19.

The lower end of the condenser 49 is connected by a conduit 52 to conduit 34. Conduit 52 includes a vessel 53.

The system contains a refrigerant fluid, such as ammonia, a liquid absorbent for the refrigerant, such as water, and an auxiliary pressure equalizing fluid, such as hydrogen.

In operation of the system, refrigerant vapor is expelled from solution by heating in the generator 10. The vapor is condensed to liquid in the condenser 49 and the liquid flows through conduit 50 into the evaporator 29. Liquid ammonia evaporates in the evaporator 29 and diffuses into the hydrogen, producing a refrigerating effect. The mixture of hydrogen gas and ammonia vapor flows from the upper end of the evaporator through conduit 31, the gas heat exchanger 33, and conduit 34 to the absorber vessel 28 from where it flows upward in the absorber coil 27. Weakened absorption liquid flows from the upper standpipe chamber 20 through conduit 43, inner passage 40 of the exchanger 39, conduit 44, and conduit 38 into the upper end of the absorber coil 27. Weakened solution goes downward in the coil 27 and absorbs ammonia vapor from the rising gas. Weak gas flows from the upper end of absorber coil 27 through conduit 38, the gas heat exchanger 33, and conduit 35 back to the evaporator 29. The described circulation of gas between the evaporator and absorber takes place due to the difference in weights of the columns of weak and strong gas. The described flow of weakened absorption solution from the generator to the absorber occurs due to gravity and overflow into the upper end of the absorber coil 27.

Enriched absorption solution flows from the lower end of absorber coil 27 into vessel 28 and from there flows through conduit 45, middle passage 41 of the heat exchanger 39, and conduit 46 into the generator standpipe 12. Absorption liquid flows from the lower end of standpipe 12 into chamber 17 and thence through opening 26 into chamber 18. Liquid is raised by vapor lift action from chamber 18, through rising conduit 24 into the upper standpipe chamber 20. Ammonia vapor is expelled from solution by heating in both chambers 17 and 18. Vapor formed in chamber 18 flows upward through the vapor lift conduit 24 into the upper part of chamber 20 and thence through conduit 22 into the upper part of chamber 23 where it joins the vapor from the standpipe. Vapors flow from chamber 23 through conduit 47, outside passage 42 of the heat exchanger 39, and conduit 48 to the condenser 49.

In the triple heat exchanger 39, hot weak solution flowing from the generator toward the absorber through inner passage 40 is brought into counter-current heat exchange relation with cooler enriched solution flowing from the absorber toward the generator through middle passage 41. In this heat exchange relation, heat is transferred from the weak solution to the rich solution. Heat is also transferred to the strong solution from vapors flowing from the generator toward the condenser in the outside passage 42. Transfer of heat from the generator vapors is accompanied by condensation of water vapor in the outside passage 42. This is commonly referred to as rectification. The water vapor is caused by vaporization of solvent in the generator. When the water vapor condenses during rectification, the heat of condensation is transferred to the strong solution and returned therewith to the generator, thus conserving this heat. The water vapor and its sensible heat flows from the outside heat exchanger passage through conduit 51 to chamber 19 of the generator from where it is raised by vapor lift action through conduit 25 into the standpipe 12. Any heat of condensation of ammonia vapor in the outside passage 42 is returned with the strong solution to the generator and the condensate with its sensible heat is returned through conduit 51 to chamber 19 of the generator.

Various changes and modifications may be made within the scope of the invention which is therefore not limited except as indicated in the following claims.

What is claimed is:

1. A refrigeration system containing refrigerant and liquid absorbent for the refrigerant, and having a generator comprising a plurality of compartments and a heating flue extending through said compartments, an absorber, a rectifier, a vapor liquid lift conduit connected to one of said compartments for causing circulation of fluid between said generator and absorber, and a second vapor liquid lift conduit connected to another of said compartments for causing flow of liquid between said rectifier and generator.

2. A refrigeration system as set forth in claim 1 also having a liquid heat exchanger connected between said generator and absorber, said rectifier being in heat exchange relation with said heat exchanger.

3. An absorption refrigeration system including a condenser, an evaporator, an absorption liquid circuit including an absorber and a generator, a heated vessel, a rectifier for vapor flowing from said generator to said condenser, said rectifier being at a higher level than said heated vessel and connected thereto for flow of liquid condensate from the rectifier into said heated vessel, and a rising conduit having its lower end projecting into said vessel and forming a vapor lift by which vapor formed by heating of liquid in said vessel raises liquid to a level from which it flows by gravity into said absorption liquid circuit.

CARL T. ASHBY.